United States Patent [19]

Nakamura et al.

[11] 4,283,911
[45] Aug. 18, 1981

[54] BOOSTER

[75] Inventors: Akira Nakamura, Shizuoka; Masato Oguri, Susono, both of Japan

[73] Assignee: Toyota Jidosha Kogyo Kabushiki Kaisha, Aichi, Japan

[21] Appl. No.: 46,046

[22] Filed: Jun. 6, 1979

[30] Foreign Application Priority Data

Aug. 1, 1978 [JP] Japan .......................... 53-106328[U]

[51] Int. Cl.³ .......................... B60T 13/00; F15B 9/10
[52] U.S. Cl. .................................. 60/547 R; 60/554; 91/369 A; 91/369 B
[58] Field of Search ............. 91/369 B, 369 A, 369 R, 91/434, 374; 60/547 R, 554

[56] References Cited

U.S. PATENT DOCUMENTS

| | | | |
|---|---|---|---|
| 3,175,235 | 3/1965 | Randol | 91/369 B |
| 3,691,903 | 9/1972 | Shellhouse | 91/369 A |
| 3,845,692 | 11/1974 | Takeuchi | 91/369 B |

Primary Examiner—Paul E. Maslousky
Attorney, Agent, or Firm—Browdy and Neimark

[57] ABSTRACT

A booster having a feature of stroke jumping. In this type of booster a power piston, which is actuated by the difference of fluid pressure acting on either side thereof, is so constructed as to be able to shift, in relation to a control piston with a built-in control valve for controlling the fluid pressure, within a certain limited distance. Between the output member of the booster and the two pistons, i.e., power and control, is disposed a power lever, which is abutted at either end thereof on the output portion of the two pistons and at the middle portion thereof on the output member, for transmitting the movement of both pistons to the output member, while allowing the relative movement of both pistons. The output stroke of this booster can be made greater than the input stroke by means of the relative movement of the power piston to the control piston.

10 Claims, 4 Drawing Figures

BOOSTER

BACKGROUND OF THE INVENTION

This invention relates to a booster, provided with a power piston which is operated by fluid pressure, for boosting input force applied to an input member in order to output the same force after having boosted.

This type booster has been widely used in the brake operation mechanism in the vehicles or the like for the purpose of increasing the output force without increasing the input stroke. In the conventional boosters the input stroke is generally made equal in its amount to the output stroke (the input stroke is larger, to be more exact, than the output stroke by the amount of its idle stroke), which is liable to make the input stroke uselessly large, being an inevitable weak point.

Assuming a case wherein a mechanism under observation is a vehicle hydraulic brake, it is required that fluid (oil) consumption due to initial stage elastic deformation of each component member of the hydraulic system such as piston cup should be compensated, to say nothing of the requirement of eliminating the brake clearance, during the time from starting of the piston movement in the master cylinder to starting of the close sliding of the brake shoe or brake pad onto the brake drum or brake disc. For that reason, the piston of the master cylinder must be moved for a considerably long distance. During the initial stroke stage the brake effect is scarecely produced, so the brake feeling to the driver won't be deteriorated even if the input stroke and the output stroke of a booster, which is to be disposed between the brake pedal and the master cylinder, are not in a proportional relationship. There is, therefore, no problem even if the piston of the master cylinder is shifted, during the initial stroke stage, independently of the operation amount of the brake pedal by the driver, provided that the operation amount of the brake pedal comes into proportional relationship with the shift amount of the master cylinder after the starting of the sliding of the brake shoe or brake pad with the drum or disc. It is not a requisite that the input and output stroke of the booster should be identical during the entire operation range, as conventionally has been so believed.

SUMMARY OF THE INVENTION

This invention was made from such a background, so it is a primary object of this invention to provide a booster which makes it possible to get a greater output stroke than the input stroke applied.

It is another object of this invention to provide a booster which enables a greater output stroke to be got from a scanty input stroke within a stroke range wherein the input and output strokes are not required to be in a proportional relationship, and further enables the output stroke to be proportional to the input stroke within a stroke range wherein the two strokes are required to in a proportional relationship.

It is a further object of this invention to provide a booster which makes it possible to reduce the operation stroke without increasing size of the booster or required force to the braking operation, and further makes the attaining of the stroke reduction possible without giving the driver a disagreeable feeling of discrepancy between the brake operation feeling and the actual braking effect.

It is a still further object of this invention to provide a booster which makes it possible to be manufactured at a lowest possible cost and fully realizing the abovementioned objects.

A booster in accordance with this invention is characterized in being provided with (a) a power piston, located between an input member and an output member, being disposed in such a manner as to divide an inner chamber of an airtightly closed casing into two parts, and being constantly biased by a spring means to an original position while capable of being operated, resisting the action of the spring means, due to the difference of pressure in the two chambers; (b) a control piston movably disposed within a previously limited distance in relation to the power piston, and being normally retained by a spring means at an original position while capable of moving together or integrally with the power piston after the relatively movable distance has been reduced to zero due to the operation of the power piston; (c) a control valve, disposed between the control piston and the input member, for being operated by a relative shifting of both in order to control the pressure difference in the two chambers on opposite sides of the power piston; (d) an intermediate mechanism for transmitting a force imparted from the control piston and the input member while allowing the relative shifting of both; and (e) a power lever, which abuts at one end thereof on the output portion of the intermediate mechanism and abuts at the other end thereof on the output portion of the power piston, and furthermore abuts at the middle portion thereof on the output member, for transmitting an output force imparted from the intermediate mechanism and the power piston, while allowing the relative shifting of both.

This invention has succeeded, in other words, in providing a novel booster which enables getting a desired amount of output stroke in the initial stage of operation with very little input stroke, and afterwards getting an identical function to that in the conventional boosters, by means of applying only a slight alteration on the structure of the conventional boosters. As it shows an effect of largely reducing the operation stroke in the brake mechanism, it can be said quite useful especially in the field of vehicle brake use, wherein operation must be carried out in a limited narrow space as well as at a light touch.

DETAILED DESCRIPTION OF THE PREFERRED EMBODIMENTS

With reference to the appended drawings illustrating embodiments, detailed description of the present invention will be made hereunder. Other objects, features, structures, and effects of this invention will be apparent from the studying of the description as well as the attached claims.

Figure 1:
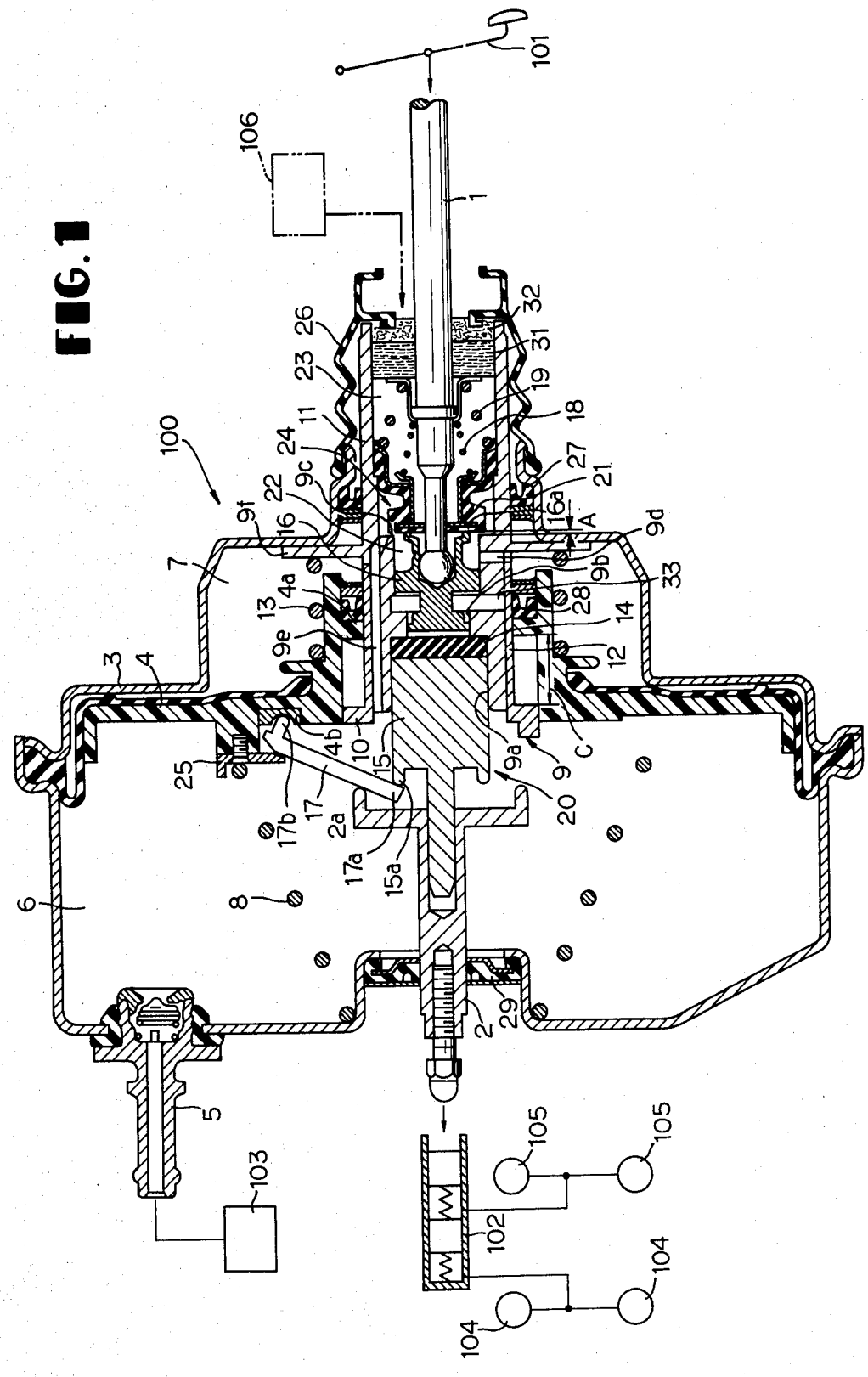
FIG. 1 is an axial cross-section, in elevation, of a booster as an embodiment of this invention.

FIG. 1 shows an embodiment in which the invention is applied to a vacuum booster embodying in a hydraulic brake operating device of a vehicle. This vacuum booster 100 is to boost the input, which is applied from a brake pedal 101 to an operating rod 1, an input member, for outputting the boosted force from a push rod 2, an output member, to the master cylinder 102. The hydraulic pressure produced in the master cylinder 102 is transmitted to a front wheel brake 104 and a rear wheel brake 105 for operating those brakes 104, 105.

The vacuum booster 100 is provided with an air-tight casing 3, which is divided into two parts as shown in FIG. 1 by a power piston 4 of a diaphragm type. One of the two parts (forward chamber of the power piston 4) is a constant-pressure chamber 6 which is connected, via a pipe joint 5 with a check valve, to a vacuum source such as an intake manifold of the engine, a vacuum pump, etc.; and the other (backward chamber of the power piston 4) is a variable pressure chamber 7 which is selectively connected, by a later described control valve, to the constant pressure chamber or the ambient atmosphere. The power piston 4 is constantly biased, by a return spring 8, in the rightward direction in FIG. 1 to be maintained in an original position, being abutted to the inner surface of the casing 3, with an exception of being shifted leftwardly (forwardly), overcoming the spring force of the return spring 8, when the pressure difference between the constant pressure chamber 6 and the variable pressure chamber 7 exceeds a predetermined value. In a through-bore axially formed in the central portion of the power piston 4 is slidably fitted a control piston 9 of cylindrical form, which is composed of a main body 11 and a supplementary member 12 threaded thereonto. A flange shaped stopper 10 formed on the outer periphery of the supplementary member 12 and a flange portion 4a formed on the inner periphery of the through-bore of the power piston 4 are confronted to each other with a certain distance C inbetween. Between the control piston 9 and the power piston 4 is mounted a compression spring 13, which maintains the control piston 9, with the spring force thereof, in an original position wherein a flange portion 9f of the control piston 9 abuts on the inner surface of the casing 3. The spring force of this compression spring 13 is designed such that the same is slightly larger than the force biasing the control piston 9 leftwardly which consists in the difference of the pressure affecting on opposite sides of the control piston 9, even when the compression spring 13 is in a farthest expanded state wherein the flange portion 4a is abutted on the stopper 10 as a result of operation of the power piston 4 by the pressure difference between the constant pressure chamber 6 and the variable pressure chamber 7. In the central part of the control piston 9 is formed a stepped bore composed of a large diametered bore 9a and a small diametered bore 9b, in the former being fitted a reaction disc 14 and an intermediate piston 15 as a large diametered member and in the latter fitted a valve plunger 16 as a small diametered member. The reaction disc 14 formed of a soft material such as rubber, soft resin or the like functions to transmit the force applied from both the valve plunger 16 and the control piston 9, while allowing a relative movement between the two, to a later described power lever 17, via the intermediate piston 15. It can be said that the reaction disc 14 and the intermediate piston 15 constitute an intermediate mechanism 20. The valve plunger 16 is fixed on the tip of the operating rod 1 for being able to be integrally moved therewith. And the operating rod 1 is constantly biased in the rearward or retracting direction (rightward in FIG. 1) by the compression springs 18 and 19.

On the control piston 9 is formed a first valve seat 9c and on the valve plunger 16 is formed a second valve seat 16a. In confrontation to those two valve seats is disposed a poppet assembly 21, which being so well known that no further explanation is made. It constitutes, being biased toward both valve seats 9c, 16a by a compression spring 18, a vacuum valve together with the first valve seat 9c and an air valve together with the second valve seat 16a. In FIG. 1 the first valve seat 9c is spaced from the poppet assembly 21 and the second valve seat 16a is in contact therewith for opening the vacuum valve and closing the air valve, with the result of communicating the variable pressure chamber 7 with the constant pressure chamber 6, via a connecting passage 9d, an intermediate chamber 22, the vacuum valve and a communicating passage 9e, and being separated or isolated from the ambient atmosphere. When the operating rod 1 is shifted leftwardly (in FIG. 1) for making the second valve seat 16a to be disengaged from the poppet assembly 21 and come in contact with the first valve seat 9c, the variable pressure chamber 7 will be separated (isolated) from the constant pressure chamber 6 for being communicated, via a passage 23, with the ambient atmosphere. In other words, a control valve 24 for controlling the pressure difference between the variable pressure chamber 7 and the constant pressure chamber 6 based on the relative movement (shifting) of the control piston 9 and the operating rod 1, is constituted of the three, i.e., the first valve seat 9c, the second valve seat 16a, and the poppet assembly 21.

Although the output from the intermediate mechanism 20 is, as stated earlier, transmitted to the power lever 17, the output of the power piston 4 is also transmitted to the power lever 17, consequently the summed force of the two outputs is to be transmitted to the push rod 2. It becomes the output itself of the vacuum booster 100. The power lever 17 is abutted, at a first input end 17a thereof, on the output projection 15a of the intermediate piston 15, at a second input end 17b thereof, on an output metal fitting 4b inbedded in the power piston 4, and further at the middle portion thereof on an input projection 2a of the push rod 2, for transmitting the sum of the output from power piston 4 and the intermediate mechanism 20 to the push rod 2, while allowing the relative movement of the power piston 4 and the intermediate mechanism 20. Irrespective of the illustration of the power lever only one in FIG. 1, it is disposed actually three in all in this embodiment with 120 angular difference to each other. Numeral 25 designates a disengagement preventing member for the power lever 17, concurrently serving the return spring 8 as a seat for its disposition.

Numeral 26 designates a dust boots, and 27, 28, and 29 are respectively a seal. Numerals 31 and 32 designate a filter. A stopper member 33 is fixed to the control piston 9 and engaged with a portion of the valve plunger 16 at the same time for limiting the relative movement amount therebetween.

Operation of the booster 100 will be described with reference to FIG. 2 which illustrates as a graph the relationship between the input and output of the vacuum booster 100. The second (II) and fourth (IV) quadrants respectively show the relationship, between the input force and the output force and between the input stroke and the output stroke, in respect to the vacuum booster 100 itself. On the other hand, the third (III) quadrant shows the relationship between the stroke and load in the hydraulic brake mechanism (composed of the master cylinder 102, the front wheel brake 104, and the rear wheel brake 105), a mechanism under the influence of the booster 100, representing a general trend curve seen there.

Let fall a straight parallel line respectively, from a given point on the curve in the third (III) quadrant, to the ordinate and abscissa; then let fall again a straight parallel line respectively, from the intersecting points with the respective characteristic line in the second (II) and the fourth (IV) quadrants, to the abscissa and the ordinate for finding an intersecting point of the last two straight lines. Linking the many intersecting points consecutively got in the similar way, a characteristic line will be obtained in the first (I) quadrant. This characteristic line indicates the relationship between the actual input stroke and the input force of a vacuum booster 100, in a case where the same, having the characteristic lines shown in the second (II) and fourth (IV) quadrants, operates a hydraulic brake mechanism with the characteristics shown in the third (III) quadrant. The nearer the intersecting point found in the first (I) quadrant, which is corresponded to a given point on the characteristic line in the third (III) quadrant, is to the intersecting point of the coordinates (origin), the better is the brake operation feeling for the driver.

In an unoperational condition of the booster 100 each member thereof is situated as shown in FIG. 1, that is to say, the operating rod 1 is kept at a retracted position by the action of the compression springs 18, 19; and the variable pressure chamber 7 is communicated with the constant pressure chamber 6 to hold the both sides of the power piston 4 at an identical pressure, because the poppet assembly 21 is spaced from the first valve seat 9c. Consequently the power piston 4 is urged onto the inner surface of the casing 3 due to the action of the return spring 8 and the control piston 9 is also urged onto the inner surface of the casing 3 by the compression spring 13. When the brake pedal 101 is depressed at this situation the operating rod 1 is to be advanced (leftwards in FIG. 1) accompanied by a forward shifting of the valve plunger 16 and the poppet assembly 21, consequently separating the variable pressure chamber 7 from the constant pressure chamber 6 due to the contact of the poppet assembly 21 onto the first valve seat 9c. The stroke of the operating rod 1 at this time is a so-called idle stroke, being shown in FIG. 2 as A. In this embodiment, even at this moment when the operating rod 1 has been advanced by the initial stroke a slight clearance (distance) B is still left between the valve plunger 16 and the reaction disc 14, as can be seen in FIG. 3, both being retained in an uncontacted condition.

When the operating rod 1 is further advanced after the contact of the poppet assembly 21 onto the first valve seat 9c, the second valve seat 16a is spaced from the poppet assembly 21 to communicate the variable pressure chamber 7 with the ambient atmosphere, allowing the inflow of air thereinto with the result of pressure rising. It causes to render the pressure on opposite sides of the power piston 4 different or unequal, rapidly advancing the power piston 4 resisting the force of the return spring 8, to rotate the power lever 17 about the output projection 15a of the intermediate piston 15, a fulcrum. The push rod 2, which abuts on the power lever 17 at the middle portion thereof, is consequently advanced. The control piston 9 remains stationary irrespective of the advancement of the power piston 4, being held in abutment onto the inner surface of the casing 3 at the flange portion 9f thereof. So the characteristic line indicating the relationship between the input stroke and the output stroke in the fourth (IV) quadrant of FIG. 2 runs parallelly to the ordinate. This phenomenon will be called hereunder stroke jumping.

When the push rod 2 is advanced to shift the piston of the master cylinder 102, the pressure therein will be raised and consequently a reactionary force pushing back the push rod 2 will be produced. This force is to be transmitted, by way of the power lever 17, to the power piston 4 and the intermediate piston 15. Although the force which has been transmitted to the intermediate piston 15 is, in turn, delivered to the control piston 9 by way of the reaction disc 14, it is to be received after all by the casing 3 because of the continuing abutment of the control piston 9 on the inner surface of the casing 3. As the valve plunger 16 is still, at this time, in a non-contact condition onto the reaction disc 14, the operating rod 1 is affected by no other force than the spring force of the compression springs 18, 19, there being no increase of input force. The characteristic line showing the relationship between the input force and the output force in the second (II) quadrant in FIG. 2 runs parallel to the abscissa. This phenomenon is called hereunder force jumping.

If the power piston 4 is advanced by a distance C, the flange portion 4a thereof will be abutted onto the stopper 10, causing henceforth an integral movement of the power piston 4 and the control piston 9. At the moment of abutment of the flange portion 4a on the stopper 10, the valve plunger 16 begins to contact with the reaction disc 14, as the clearance between both members is so selected or designed.

After the beginning of the integral movement of the power piston 4 and the control piston 9, as well as the initiation of the contact between the reaction disc 14 and the plunger valve 16, the force $F_1$ applied to the operating rod 1 and the output $F_2$ produced at the push rod 2 will be varied while keeping a linear relationship represented by the following equation:

$$F_2 = (1+1/r) \cdot s \cdot (F_1 - f_1 + a) - f_2$$

wherein
  r: lever ratio of the power lever 17 (the length between the contact point with the push rod 2 and the second input side end is divided by the length between the contact point and the first input side end)
  s: ratio between the contact area of the reaction disc 14 against the intermediate piston 15 and the contact area of the reaction disc 14 against the valve plunger 16 (quotient: the former is divided by the latter)
  $f_1$: spring force of the compression spring 18, 19
  $f_2$: spring force of the compression spring 8
  $a$: jumping load (restoring force produced in the reactor disc 14 during the time when the reaction disc 14 is deformed to be in contact with the valve plunger 16)

The input stroke $X_1$ of the operating rod 1 and the output stroke $X_2$ of the push rod 2 are to vary along the straight line represented by the following equation:

$$X_1 = X_2 + A - C/(1+r)$$

wherein
  A: idle stroke

C: the maximum distance (clearance) between the flange portion 4a and the stopper 10 (initial distance)

Figure 2:
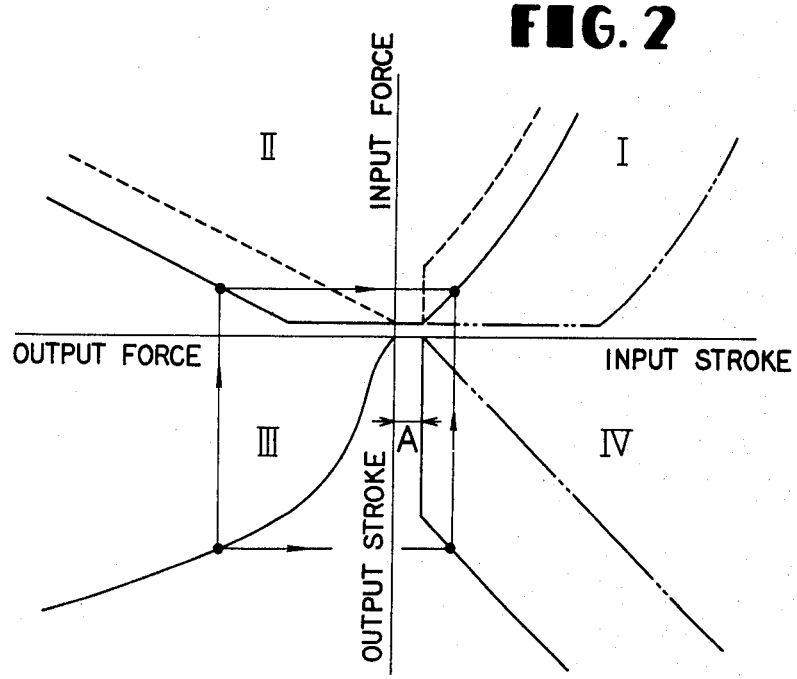
FIG. 2 is a graph for explaining the operational manner of the booster shown in FIG. 1.
Figure 3:
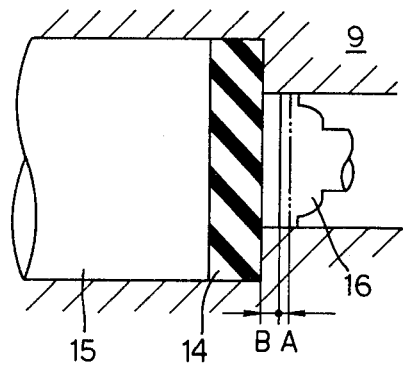
FIG. 3 is an enlargement of a part of FIG. 1.

It shows that the input stroke of the operating rod 1 and the input force thereof will vary taking the trend course shown by the solid line in the first (I) quadrant in FIG. 2, which means a reduction of the input stroke by a large margin in comparison with a case wherein no stroke jumping exisists. As can be clearly observed in the same Figure the brake feeling is quite excellent in this instance, as the input stroke is substantially in proportion to the input force.

The operational condition when the brake pedal 101 is depressed has been described above in greater detail. The completely reverse course will be traced, when the brake pedal 101 is released, to be restored to the state shown in FIG. 1.

In this embodiment a force jumping is also designed to appear, in addition to the stroke jumping, so a unique effect of producing the input stroke which is nearly proportional to the input load has been obtained, not merely limited to the reduction of the input stroke. Even when the force jumping is not produced, an effect of input stroke reduction shown with a broken line in FIG. 2 can be expected.

Figure 4:
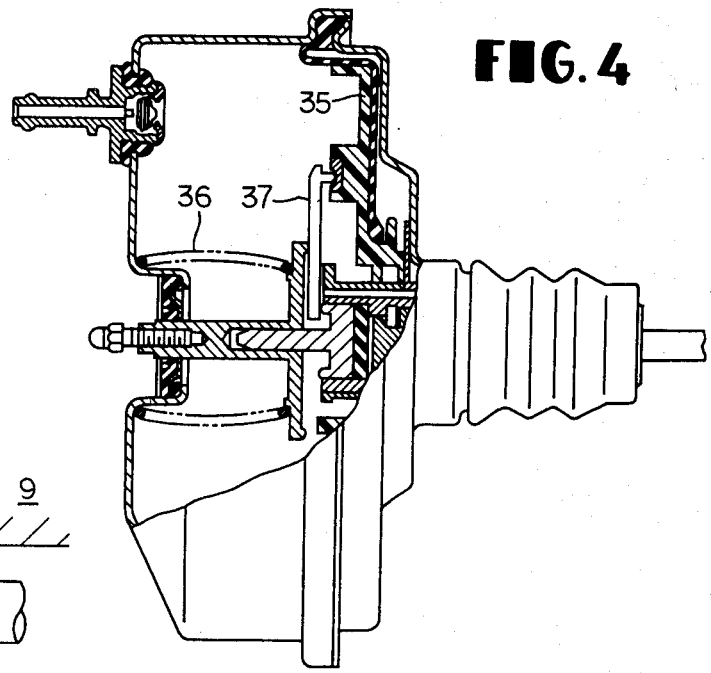
FIG. 4 is an elevation partially cut away of a booster as another embodiment of this invention.

Another embodiment will be briefly described with reference to FIG. 4, wherein the return spring 36 of the power piston 35 is acted, not directly to the power piston 35, but indirectly thereto via the power lever 37, one difference from the previous embodiment. In this design the return spring 36 can concurrently serve the function which the compression spring 13 in the previous embodiment performs for retaining the control piston 9 at its original position during the initial stage of the brake stroke. As the remaining portions are almost similar to the previous embodiment, further detailed description may be safely omitted.

Additionally commenting the flexibility of the invention, a booster which employs a positive pressure source, in place of the vacuum source in the previous embodiments, is likewise possible. In this case however the constant pressure chamber shall be constantly exposed to the ambient atmosphere and a positive pressure source 106 shall be connected to the passage 23, as shown in FIG. 1 with two-dot-chain lines.

The invention is not limited to those embodiments disclosed herein, various alterations and modifications can be made easily for those skilled in the art without departing from the spirit and sphere of the present invention. And the use of the booster of this invention is not limited to the brake operation mechanism, either.

What is claimed is:

1. A booster for boosting an input force applied to an input member in order to output the same through an output member after having boosted by means of gaseous pressure comprising:
   a power piston disposed in such manner as to divide a chamber inside an air-tight casing into two chambers and operated due to the pressure difference in the two chambers situated on opposite sides of the power piston;
   a control piston slidably fitted in a through-bore axially formed in said power piston;
   spring means for biasing said power piston and said control piston to be restored to respective original positions thereof;
   said power piston being allowed to advance relatively to said control piston leaving the latter at said original position;
   limiting means for limiting the relative advancing of said power piston to a predetermined distance so as to make said power piston and said control piston advance in unison after said predetermined distance has been reduced to zero;
   a control valve disposed between said control piston and said input member, and operated by a relative movement between said control piston and said input member for controlling the pressure difference in the two chambers on opposite sides of said power piston;
   an intermediate mechanism for transmitting a force imparted from said input member; and
   a power lever, abutting at one end thereof on an output portion of said intermediate mechanism, abutting at the other end thereof on an output portion of said power piston, and abutting at the middle portion thereof on an input portion of said output member, for transmitting, while allowing relative movement between said intermediate mechanism and said power piston, the output from the former and the latter to said output member;
   whereby when said input member is shifted by a slight stroke in the intial operation stage of said booster to actuate said control valve, said power piston is advanced in relation to said control piston, independent of the stroke amplitude of said input member, instantly by said predetermined distance, and after that said power piston is advanced together with said control piston.

2. A booster in accordance with claim 1, wherein said intermediate mechanism is composed of (a) a small diametered member slidably fitted in a small diametered portion of a stepped bore axially formed in the central portion of said control piston for receiving a force from said input member; (b) a large diametered member slidably fitted in a large diametered portion of said stepped bore and abutted on one end of said power lever; and (c) a plate member of soft material, disposed in a space surrounded by said control piston, said small diametered member and said large diametered member, for transmitting forces, while allowing relative movement between said control piston and said small diametered member by means of deformation of said plate member itself from the former and the latter to said large diametered member.

3. A booster in accordance with claim 2, wherein a predetermined clearance is reserved, while said booster is in a non-operating status, between said small diametered member and said plate member of soft material.

4. A booster in accordance with claim 1, and additionally including a hydraulic braking system including a master cylinder, said booster being connected to said master cylinder of the hydraulic braking system, and wherein said predetermined distance is selected such that the same will be reduced to zero substantially when the hydraulic braking system begins to effectively brake.

5. A booster in accordance with claim 1, wherein said spring means for biasing said power piston and said control piston is one compression spring which concurrently acts on both pistons via said power lever.

6. A booster in accordance with claim 1, wherein a front side one of the two chambers on opposite sides of said power piston is connected to a negative pressure source to be a constant pressure chamber, and the other chamber on rearward side is selectively communicated, by means of said control valve, with said constant pressure chamber or ambient atmosphere to be a variable pressure chamber, the inside pressure of which is variable.

7. A booster in accordance with claim 1, wherein a front side one of the two chambers on opposite sides of said power piston is connected to ambient atmosphere to be a constant pressure chamber, and the other chamber on the rearward side is selectively communicated, by means of said control valve, with said constant pressure chamber or a compressed air supplying source to be a variable pressure chamber, the inside pressure of which is variable.

8. A booster in accordance with claim 1, wherein, said power piston is a diaphragm type piston.

9. A booster in accordance with claim 1, wherein said limiting means is a flange shaped stopper formed on the outer periphery of said control piston so as to abut on said power piston.

10. A booster in accordance with claim 1, wherein said spring means consists of a pair of compression coil springs, one of which is disposed between said casing and said power piston for biasing said power piston backwardly, and the other of which is disposed between said power piston and said control piston for biasing said control piston to be restored relatively to said control piston.

* * * * *